(12) United States Patent
Obara

(10) Patent No.: US 7,500,708 B2
(45) Date of Patent: Mar. 10, 2009

(54) INTERIOR PART FOR AUTOMOBILE

(75) Inventor: Tomoyuki Obara, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 110 days.

(21) Appl. No.: 10/568,766

(22) PCT Filed: Aug. 20, 2004

(86) PCT No.: PCT/JP2004/012003

§ 371 (c)(1),
(2), (4) Date: Aug. 10, 2006

(87) PCT Pub. No.: WO2005/018911

PCT Pub. Date: Mar. 3, 2005

(65) Prior Publication Data

US 2007/0160779 A1     Jul. 12, 2007

(30) Foreign Application Priority Data

Aug. 21, 2003     (JP)     ............................... 2003-297327

(51) Int. Cl.
*B62D 25/14*     (2006.01)
(52) U.S. Cl. ...................................................... 296/70
(58) Field of Classification Search ............... 296/70, 296/193.09, 208; 428/31; 264/259, 328.1
See application file for complete search history.

(56) References Cited

U.S. PATENT DOCUMENTS

| | | | | |
|---|---|---|---|---|
| 6,877,787 B2 * | 4/2005 | Ito et al. | .................. | 296/70 |
| 6,916,545 B2 * | 7/2005 | Yano et al. | .................. | 428/458 |
| 7,303,714 B2 * | 12/2007 | Matsuzaki et al. | .......... | 264/275 |
| 2003/0108734 A1 * | 6/2003 | Yano et al. | .................. | 428/323 |
| 2003/0193207 A1 * | 10/2003 | Ito et al. | .................. | 296/72 |
| 2004/0135400 A1 * | 7/2004 | Matsuzaki et al. | ..... | 296/193.02 |

FOREIGN PATENT DOCUMENTS

| | | |
|---|---|---|
| JP | 58-17224 | 2/1983 |
| JP | 62-76732 | 5/1987 |
| JP | 05-077659 | 3/1993 |
| JP | 06-198791 | 7/1994 |
| JP | 07-080915 | 3/1995 |
| JP | 07-214655 | 8/1995 |
| JP | 7-50277 | 11/1995 |
| JP | 11-091454 | 4/1999 |
| JP | 2002-294699 | 10/2002 |
| JP | 2004-130528 | 4/2004 |

* cited by examiner

*Primary Examiner*—H Gutman
(74) *Attorney, Agent, or Firm*—Oblon, Spivak, McClelland, Maier & Neustadt, P.C.

(57) ABSTRACT

An interior part for an automobile that is disposed on a front side in the automobile is obtained by integrally molding an instrument panel fascia, a duct, and a reinforce member by a blow molding method including: extruding a resin composition into a molten parison; holding the parison in a metal mold; and blowing the air into the parison to obtain a resin molding. Thus, as compared to an arrangement where each of the members is formed separately, the number of members can be reduced. In addition, the arrangement requires only one type of material, a metal mold, and a molding device, and does not require an assembly step that is required in the arrangement with separately molded members, resulting in reduced cost.

4 Claims, 6 Drawing Sheets

INTERIOR PART FOR AUTOMOBILE

TECHNICAL FIELD

The present invention relates to an automobile interior part including an instrument panel as a support for gauges disposed on a front side of a driver's sheet of an automobile.

BACKGROUND ART

Conventionally, ducts, a reinforce member as a structural member, etc. included in an automobile interior part have typically been formed by bending steel sheets or the like.

However, the automobile interior part such as an instrument panel has been increasingly employing resins to meet requirements such as moldability, shaping flexibility, designing flexibility, corrosion resistivity and weight saving.

Since the automobile interior part such as the instrument panel requires heat resistivity and product stiffness, there has been known a talc-reinforced resin molding formed of a polyolefin resin material such as a polypropylene and a fiber-reinforced resin molding formed of a GFRP (Glass Fiber Reinforced Plastic) that is molded using a glass fiber as a reinforced fiber and a polypropylene as a resin being a thermoplastic resin.

In such automobile interior part, the instrument panel particularly has a lot of functional parts with various functions such as an air conditioning duct, a defroster duct and a meter cluster and has a complex shape. Thus, currently, the automobile interior part is often formed by a method including separately molding a core member and each of the functional parts constituting the automobile interior part and then assembling the separately molded members. However, since the method includes a lot of members, the numbers of fabrication steps and assembly steps become large, which causes manufacturing inefficiency. Especially, a reinforce member as the structural member often uses a bended steel sheet or a metal pipe, so that a total weight becomes heavy when being assembled with other members.

With such background, there has been known an arrangement developed to solve these problems, in which a core member as a principal part of an instrument panel and predetermined functional parts are integrated (see Patent Document 1).

There has been known another arrangement in which a design part made of a soft resin and a core material made of a hard resin are integrated (see Patent Document 2). The core material is typically called a reinforce member or the like, which is designed as a structural member for securing strength and functions as a duct in the above arrangement.

There has been known a still another arrangement in which principal parts are separately molded such that, for instance, each of an upper member, a lower member and a meter hood of an instrument panel is separately molded, and these members are then assembled to form the automobile interior part (see Patent Document 3).

[Patent Document 1] JP-A-7-80915
[Patent Document 2] JP-A-6-198791
[Patent Document 3] JP-A-5-77659

DISCLOSURE OF THE INVENTION

Problems To be Solved by the Invention

However, in the arrangement of Patent Document 1, since the core member constituting a main structure of a predetermined zone of the instrument panel and the functional parts each having a function and attached to the core member are separately molded, the number of members becomes large. Thus, the arrangement requires an individual material, metal mold, molding device and the like for each of the members, as well as an assembly step for assembling the members, resulting in uneasy member control, high cost, and manufacturing inefficiency.

In the arrangement of Patent Document 2, since the design part and the core material are respectively formed of different materials, they cannot be recycled at a time, causing troublesome recycle operation. In recycling, each of the members has to be separately collected, which requires a lot of steps and cost.

In addition, in Patent Document 3, since the instrument panel is formed by separately molding each of the principal parts, it causes a problem similar to Patent Document 1.

An object of the present invention is to provide an automobile interior part with reduced number of members, reduced cost and reduced weight as well as improved recycling efficiency.

Means for Solving the Problems

An automobile interior part according to an aspect of the present invention disposed on a front side of an automobile includes: a duct; and a reinforce member, in which the duct and the reinforce member are integrally molded by a blow molding method that includes extruding a resin composition into a molten parison, holding the parison in a metal mold, and blowing the air into the parison to obtain a resin molding.

According to the aspect of the present invention, since the duct and the reinforce member are integrally molded to obtain the automobile interior part, the number of members can be reduced as compared to an arrangement where each of the members is separately molded. In addition, the arrangement requires only one type of material, metal mold and molding device, while not requiring the assembly step that is required in the arrangement with separately molded members, realizing easier control and reduced cost.

Since the duct and the reinforce member are integrally molded to form the automobile interior part, the interior part is much lighter than an arrangement in which, for instance, members formed of steel sheets are assembled, thus realizing reduced weight.

Since the duct and the reinforce member are integrally molded to form the automobile interior part, separation of the members is not necessary in recycling, thus facilitating recycling operation and thus realizing improved recycling efficiency.

According to the aspect of the present invention, it is preferable that an instrument panel fascia is integrally molded with the duct and the reinforce member by the blow molding method.

According to the aspect of the present invention, the instrument panel fascia is also integrally molded with the duct and the reinforce member, which allows reduced number of members, reduced cost due to facilitated control of the members and reduced weight as well as improved recycling efficiency, even as compared to the arrangement in which the duct and the reinforce member are integrally molded.

According to the present invention, the automobile interior part is preferably formed of the fiber-reinforced resin.

According to the aspect of the present invention, the automobile interior part with light weight and high strength can be obtained.

In the aspect of the present invention, the fiber-reinforced resin may preferably be a composition containing a fibrous filler and a polyolefin resin material such as a polypropylene.

Examples of the fibrous filler may include a glass fiber, a carbon fiber, various types of whiskers, a magnesium sulfate fiber, a potassium titanate fiber, an oxidized titanium fiber, a magnesium oxysulfate fiber, or an organic filler, an organic synthetic fiber, a natural fiber, etc. The fiber diameter of the fibrous filler is preferably 40 µm or smaller, more preferably in the range from 3 µm to 30 µm. As a form of the fiber, a continuous fiber, a chopped strand or the like is preferable.

The resin material may preferably be a thermoplastic resin regardless of a crystalline resin or a noncrystalline resin. As the crystalline rein, there may be employed a polyolefin resin, a polyester resin, a syndiotactic polystyrene or the like. As the noncrystalline resin, there is no limitation and may be employed a polyvinyl chloride, a polycarbonate, an acrylic resin, a polystyrene and the like.

As examples of the fiber-reinforced resin that is formed by blending the fibrous filler and the resin material described above, compositions such as a PP/GF, a PP/PE/GF, a PP/metallocene LL/GF, and a PP/elastomer/GF may be employed. Examples of the elastomer may include an olefin elastomer such as an EPR and an EBR, or a styrene elastomer such as an SEBS and an SEPS.

According to the aspect of the present invention, when the crystalline resin is employed as the resin material, the metal mold is filled with a molten resin composition to perform shaping when a mold temperature is in the range from [Vicat softening point −20° C.] to a melt point of the resin material. On the other hand, when the noncrystalline resin is employed as the resin material, the metal mold is filled with a molten resin composition to perform shaping when a mold temperature is in the range from [Vicat softening point −20° C.] to [Vicat softening point +20° C.] of the resin material. With the arrangement, fluidity of the resin composition is enhanced due to its contact with the metal mold, which prevents the fibrous filler from lifting up and allows a mold surface of the metal mold to be properly transferred onto the resin composition.

Here, if the metal mold is filled with the molten resin composition to perform shaping with the mold temperature lower than the [Vicat softening point −20° C.] of the resin material, the fluidity of the resin composition is lowered, unable to control the fibrous filler from lifting up. In addition, when a resin molding having a mirror surface is desired, the temperature lower than the [Vicat softening point −20° C.] of the resin material causes glossiness and resistance to scratches to be degraded, while causing surface roughness to be increased, which is disadvantageous in appearance. On the other hand, if the mold temperature is set to the melt point or higher than the [Vicat softening point +20° C.] of the resin material, a molding cycle becomes longer, which is industrially disadvantageous in terms of manufacturing efficiency and energetic efficiency.

According to the aspect of the present invention, it is preferable that a lifting dimension of the fibrous filler appearing on and lifted from a design side surface of the automobile interior part is controlled to be equal to or smaller than half of a fiber diameter of the fibrous filler (A).

According to the aspect of the present invention, since the lifting dimension of the fibrous filler (A) appearing on the design side surface can be controlled, the resin molding with good appearance can be provided.

In the above description, a recitation "a lifting dimension of the fibrous filler appearing on and lifted from the surface is equal to or smaller than half of a fiber diameter of the fibrous filler" indicates a condition in which the lifting of the fibrous filer from the design side surface cannot be visually observed.

Here, if the lifting dimension of the fibrous filler on the design side surface of the automobile interior part exceeds half of the fiber diameter of the fibrous filler, the appearance is degraded with the lifting of the fibrous filler from the design side surface being visibly observable, which might spoil commercial value. If, on the other hand, the lifting dimension of the fibrous filler is equal to or smaller than half of the fiber diameter of the fibrous filler, the lifting of the fibrous filler from the design side surface cannot be visibly observed, thus preventing the appearance from being degraded.

Herein, the design side indicates a surface visible from a driver or other occupants.

According to the aspect of the present invention, it is preferable that: the fiber-reinforced resin is formed by the resin composition containing the fibrous filler (A) in the range from 7 to below 30 wt % and the resin (B) in the range from above 70 to 93 wt %; a surface of the interior part has a grain; (1) when an entire surface of a resin molding has the grain, rate of transfer of the metal mold is equal to or higher than 70%; and (2) when a part of the surface of the resin molding has the grain, the rate of transfer of the metal mold is equal to or higher than 70%, and a surface roughness of a part without the grain is equal to or less than 5 µm.

The rate of transfer of the metal mold is preferably equal to or higher than 80%, more preferably, 85% to 95%.

As the rate of transfer of the metal mold, for instance, a ratio (h/H) of a grain depth H on the metal mold to a grain depth h on the resin molding molded by the metal mold can be employed. When the rate of transfer of the metal mold is less than 70%, the lifting of the fibrous filler (A) occurs, or the transfer of the grain becomes insufficient, resulting in degradation of the appearance.

For the resin molding with the grain on a part thereof, if the surface roughness of a part without the grain exceeds 5 µm, the lifting of the fibrous filler (A) becomes visible, which might cause degradation of the appearance and unsharpness of the transfer.

According to the aspect of the present invention, by satisfying either of (1) or (2), the lifting of the fiber filler can be controlled and the resin molding that has good appearance can be provided.

EXPLANATION OF CODES

| | |
|---|---|
| 1 | instrument panel module (automobile interior part) |
| 2 | blow molding machine |
| 10 | instrument panel fascia |
| 11 | air conditioning duct |
| 12 | defroster duct |
| 14 | reinforce member |
| 22 | metal mold |
| P | parison |

BEST MODE FOR CARRYING OUT THE INVENTION

An embodiment of an automobile interior part according to the present invention will be described below with reference to the attached drawings.

Figure 1:
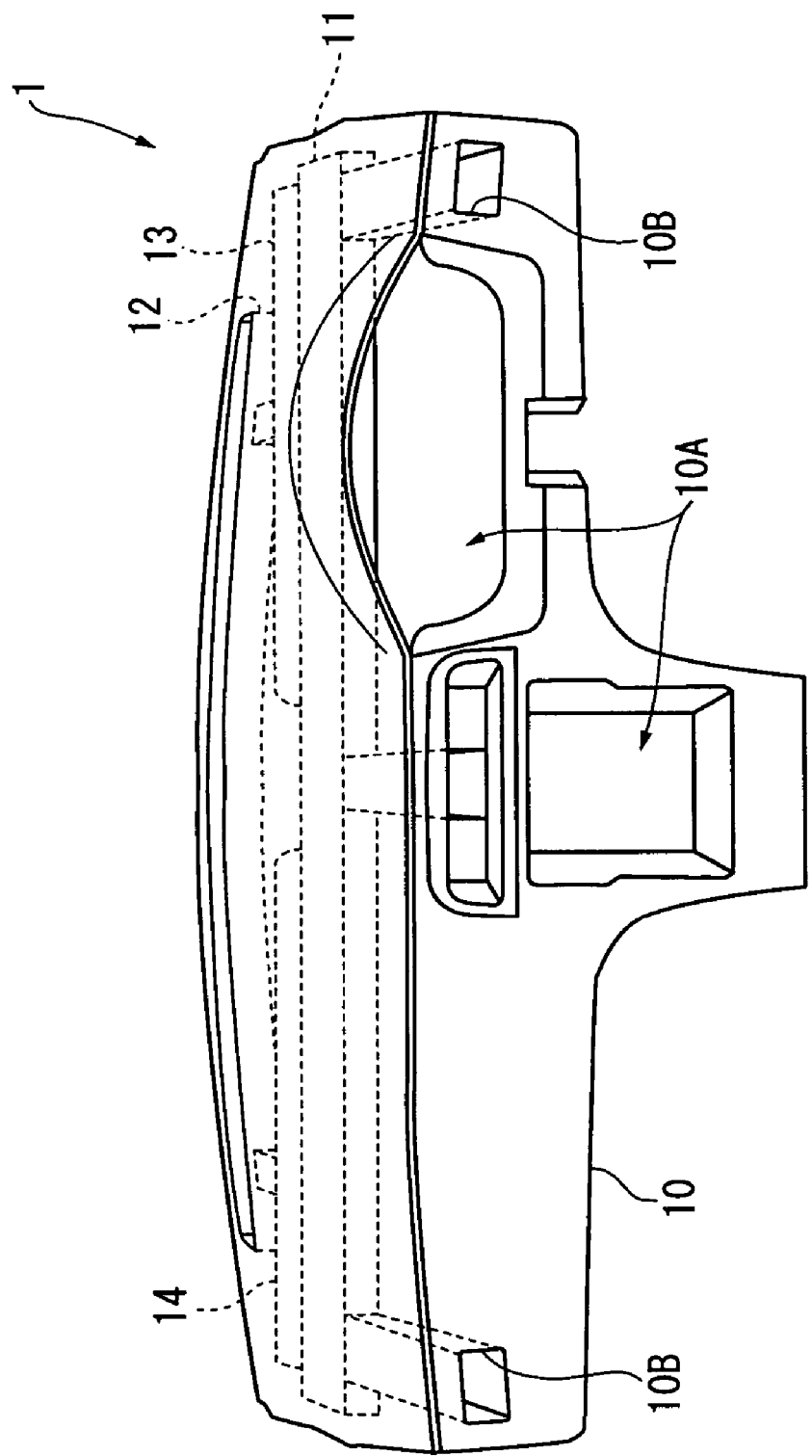
FIG. 1 is an overall view showing an outline of an instrument panel according to an embodiment of the present invention.
Figure 2:
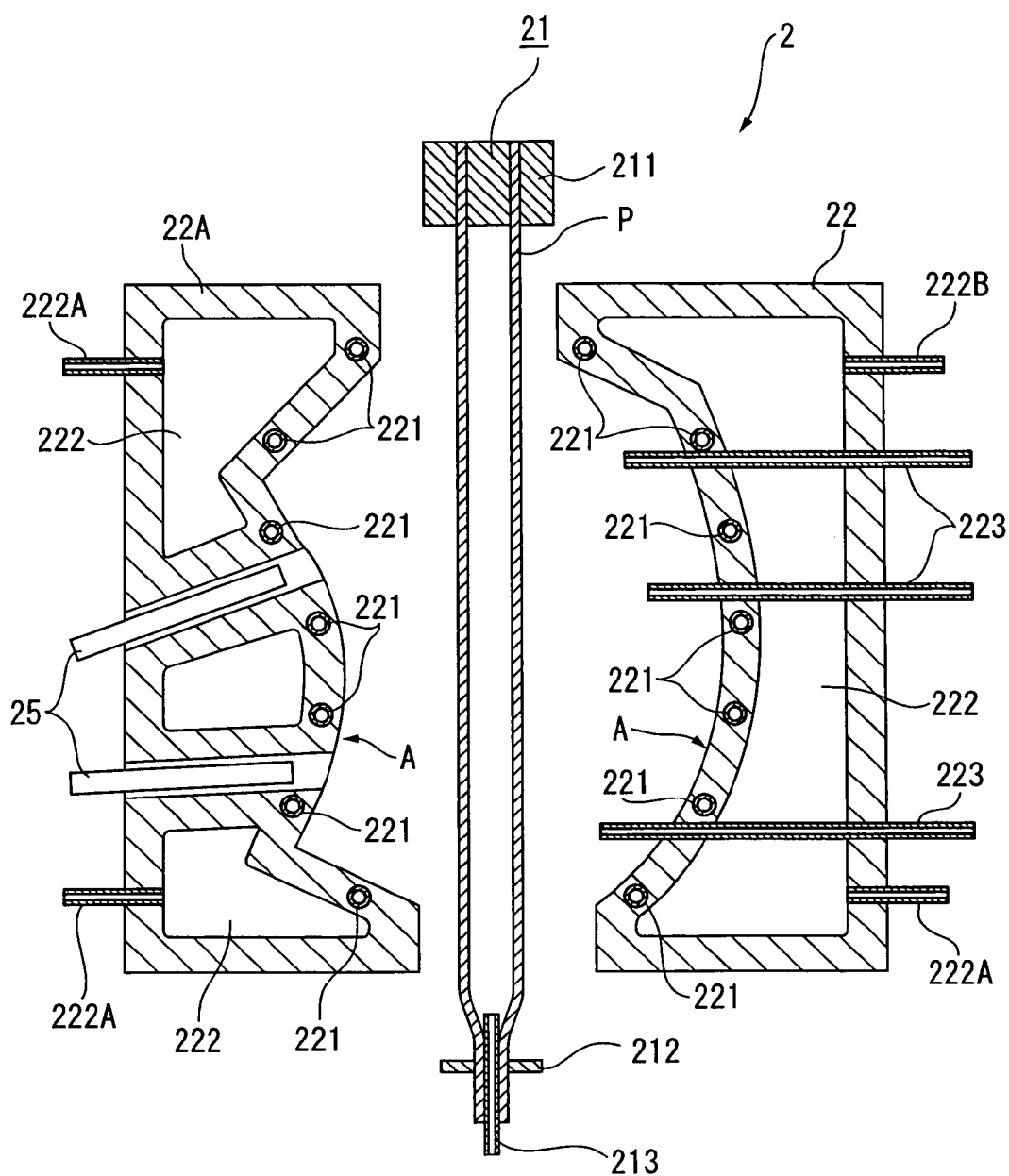
FIG. 2 is a cross section showing a blow molding machine for molding according to the embodiment.
Figure 3:
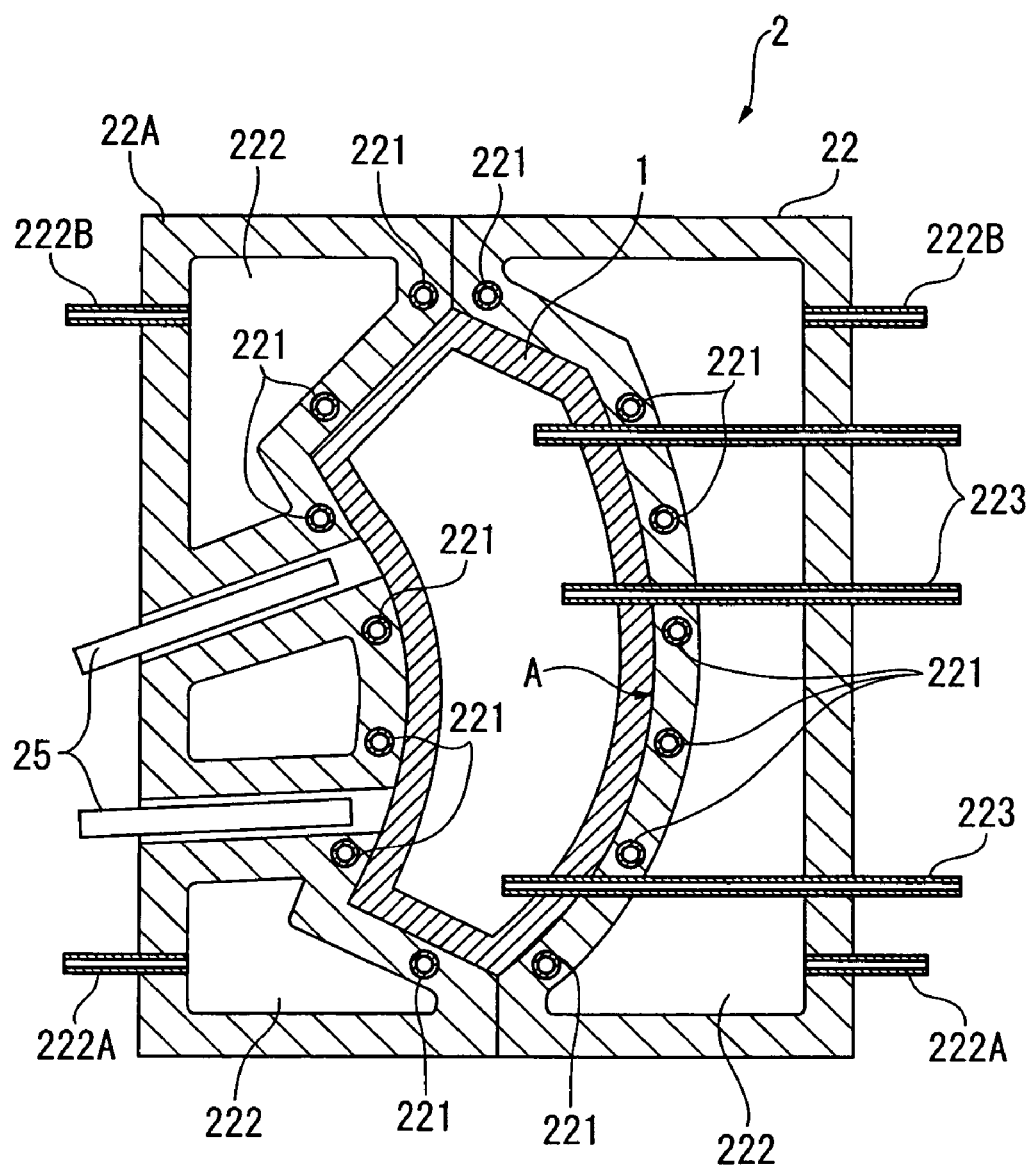
FIG. 3 is a cross section showing a state during molding according to the embodiment.
Figure 4:
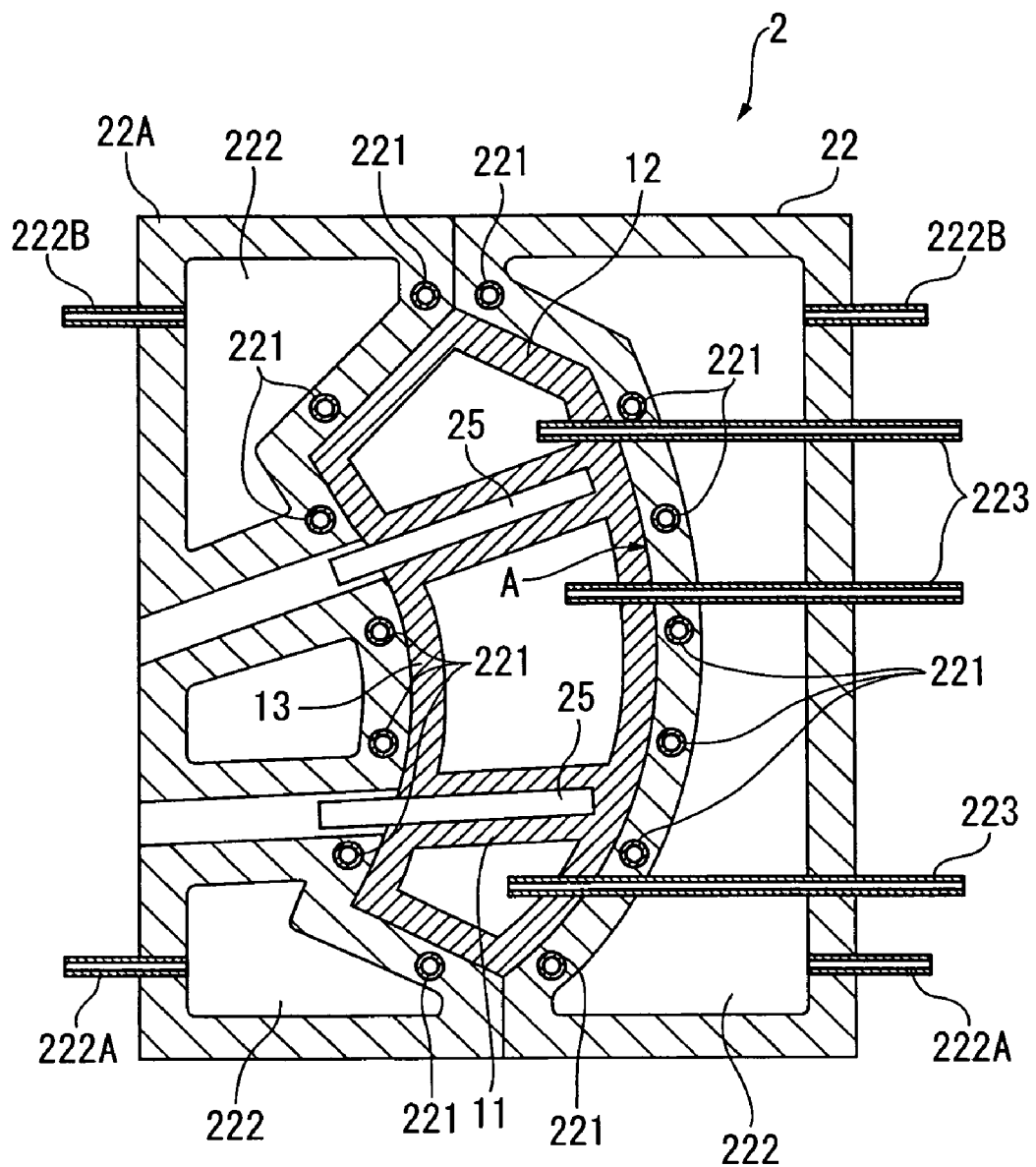
FIG. 4 is a cross section showing a state with the molding advanced from the state in FIG. 3.

FIG. 1 shows an instrument panel module 1 as the automobile interior part of the embodiment, while FIGS. 2 to 4 show a blow molding machine 2 for blow molding the instrument panel module 1.

As shown in FIG. 1, the instrument panel module 1 is formed by integrating an instrument panel fascia 10, an air conditioning duct 11, a defroster duct 12 and a reinforce member 13 as a structural member.

Front openings 10A, 10B of the instrument panel fascia 10 are provided to mount gauges such as a speed meter, a storage space, audio equipment, car navigation equipment and the like.

The ducts 13 are provided for an air conditioner, a heater, a defroster and the like that are mounted inside the instrument panel fascia 10, and conditioned cool air and warm air are blown out from the front openings 10A, 10B of the instrument panel fascia 10.

The reinforce member 13 connects the instrument panel fascia 10 to the ducts 13 such as the air conditioning duct 11 and the defroster duct 12 in order to reinforce the entire instrument panel module 1.

The above-described instrument panel module 1 is blow-molded by the blow molding machine 2 as stated above.

Specifically, the blow molding machine 2 is a machine that molds a resin composition obtained by blending a fibrous filler (A) and a thermoplastic resin (B) into a predetermined shape to manufacture the instrument panel module 1, the blow molding machine 2 having a blow molding machine body 21 and a metal mold 22.

The blow molding machine body 21 melts and blends the resin composition and extrudes the resin composition into the metal mold 22 as a parison P, the body 21 having: an extruding die 211 that forms the extruded parison P into a cylindrical shape; a parison sealing member 212 for sealing a lower end of the parison P; and an air blowing tube 213 for blowing the air into the parison P.

The metal mold 22 is openably and closeably formed, an inside of which defines a cavity A for forming the instrument panel module 1. The metal mold 22 includes: a mold-temperature controlling tube 221 for sandwiching the parison P extruded by the blow molding machine body 21 and to control the temperature of the metal mold 22; a cooling jacket 222 for cooling the metal mold 22; and air blowing tubes 223 for blowing the air from the metal mold 22 into the parison P inside the metal mold 22. The mold-temperature controlling tube 221 conditions the temperature of the metal mold 22 by, for instance, circulating steam, heated oil or the like.

Two slide cores 25 for preventing undercut is provided to predetermined parts of the other metal mold 22A in a manner advanceable into and retractable from the cavity A, the slide cores 25 being connected to a drive source (not shown) such as a cylinder.

The cooling jacket 222 includes a coolant inlet port 222A and a coolant outlet port 222B each connected to the outside, through which a coolant is introduced from the outside to cool the metal mold 22.

The air blowing tube 223 is formed through the inside and the outside of the metal mold 22 in a manner advanceable and retractable. The air blowing tube 223 is advanced into the metal mold 22 so that it sticks into the parison P to blow the air into the parison P.

Next, a molding method of the resin composition using the above-described blow molding machine 2 will be described.

First, the blow molding machine 2 is actuated and an extruder (not shown) melts, blends and extrudes the resin composition. The cylindrical parison P is extruded from the extruding die 211 into between a pair of metal molds 22, typically using an accumulator. Then, the lower end of the extruded parison P is sealed by the parison sealing member 212.

Next, the air is blown into the parison P from the air blowing tube 213 to pre-blow the parison P until the parison P is inflated to some extent. Then, the metal mold 22 is started to be closed to sandwich the parison P.

Next, as shown in FIG. 3, when the metal mold 22 is almost closed completely, the air blowing tube 223 advances from a mold surface of the metal mold and sticks into a parison wall, from which the air is blown into the parison P. Consequently, the parison P is inflated to be pressed and firmly attached onto the mold surface of the metal mold 22, whereby shaping of the instrument panel module 1 is performed.

Next, as shown in FIG. 4, during shaping, the drive source is driven to advance the slide cores 25 to form a dent 1A so that the undercut is not generated on the back side of the parison P. At this time, the air is blown into the parison P from the air blowing tube 223 as needed.

Here, when the thermoplastic resin (B) is a crystalline resin, a temperature of the metal mold 22 (shaping temperature) is preferably set by the mold-temperature controlling tube 221 to a temperature range from [Vicat softening point Tb −20° C.] to below a melt point of the thermoplastic resin (B).

On the other hand, when the thermoplastic resin (B) is a noncrystalline resin, the temperature of the metal mold 22 is preferably set to a temperature range from [Vicat softening point Tb −20° C.] to [Vicat softening point +20° C.] of the thermoplastic resin (B).

Further, it is even more preferable to set to: a temperature range from [Vicat softening point Tb −10° C.] to [melt point −10° C.] of the thermoplastic resin (B) when the thermoplastic resin (B) is the crystalline resin; and a temperature range from [Vicat softening point Tb −10° C.] to [Vicat softening point Tb +10° C.] of the thermoplastic resin (B) when the thermoplastic resin (B) is the noncrystalline resin.

Next, after shaping the resin composition in the metal mold 22, the molten resin composition in the metal mold 22 is cooled by the cooling jacket 222.

Here, when the thermoplastic resin (B) is the crystalline resin, the temperature (keeping temperature) of the metal mold 22 is preferably kept in a range from [crystallization point Tc −15° C.] to [crystallization point Tc +10° C.] of the thermoplastic resin (B) for a predetermined time, more preferably in a range from [crystallization point Tc −10° C.] to [crystallization point Tc] of the thermoplastic resin (B) for the predetermined time.

The predetermined time to keep the temperature should be 10 to 300 seconds, preferably 30 to 200 seconds. Although longer keeping time is more effective, if the keeping time exceeds 300 seconds, the molding cycle becomes too long, which disadvantageously degrades manufacturing efficiency. The temperature range and the keeping time can be determined based on tolerances of warpage of the resin molding and lifting of the fibrous filler by comprehensively taking into account size and thickness of the resin molding, a type of the resin, whether or not to add an additive, and the like.

In order to keep the metal mold 22 at the predetermined temperature, a heated medium is held in the mold-temperature controlling tube 221 while circulating the coolant within the cooling jacket 222.

Next, after the metal mold 22 is kept at the predetermined temperature for the predetermined time, the medium having been heated to the predetermined temperature in the mold-temperature controlling tube 221 and the cooling jacket 222 is discharged, and a coolant with a temperature around the ambient temperature is introduced into the cooling jacket 222 to cool the metal mold to a temperature (cooling temperature) that allows the resin composition to be taken out, e.g., equal to or lower than a glass transition point Tg of the thermoplastic resin (B). A cooling speed at this time should be within a range that is typically employed in the blow molding method.

When the thermoplastic resin (B) is noncrystalline resin, the metal mold 22 is cooled down to the temperature that allows the resin composition to be taken out without keeping the metal mold 22 for the predetermined time.

With the steps described above, the instrument panel module 1 is manufactured by the blow molding method.

Incidentally, examples of the fibrous filler (A) may include a glass fiber, a carbon fiber, various types of whiskers, a magnesium sulfate fiber, a potassium titanate fiber, an oxidized titanium fiber, a magnesium oxysulfate fiber, or an organic filler, an organic synthetic fiber, a natural fiber, etc. As a form of the fiber, a continuous fiber, a chopped strand or the like can be employed. The fiber diameter of the fibrous filler (A) is preferably equal to or smaller than 40 µm, more preferably, 3 µm to 30 µm.

The thermoplastic resin (B) may employ a polypropylene, a polyethylene, a polystyrene, a polycarbonate, an ABS (acrylonitrile butadiene styrene copolymer), an AES (acrylonitrile-ethylenepropyrene-styrene terpolymer), an AS (acrylonitrile-styrene copolymer), a modified PPE (polyphenylene ether), a PPS (polyphenylene sulfide), a nylon, a SPS (syndiotactic polystyrene), etc. and a blended material of the above.

Then, it is preferable to obtain the resin composition containing the fibrous filler (A) in the range from 7 to below 30 wt % and the thermoplastic resin (B) in the range from above 70 to 93 wt %. More preferably, the resin composition contains the fibrous filler (A) in the range from 10 wt % to 25 wt %.

According to the above-described embodiment, the following advantages can be obtained.

Specifically, since the instrument panel module 1 as the automobile interior part is formed by integrally molding the instrument panel fascia 10, the ducts 13 and the reinforce member 13, it requires reduced number of members as compared to the arrangement in which each of the members is separately molded, as well as requiring only one type of material, metal mold, molding device, etc. Further, the assembly step that is required in the arrangement with separately molded members is not required, thus resulting in reduced cost.

Since the instrument panel module 1 is formed by integrally molding the instrument panel fascia 10 and the like, weight increase due to overlap spaces, joint members and the like that are required in the arrangement with separately molded members can be prevented, thus resulting in reduced weight.

Since the instrument panel module 1 is formed by integrally molding the instrument panel fascia 10 and the like, separation of the members is not necessary in recycling, thus facilitating recycling operation and thus realizing improved recycling efficiency.

Since the fiber-reinforced resin is formed by the resin composition containing the fibrous filler (A) in the range from 7 to below 30 wt % and the resin (B) in the range from above 70 to 93 wt %, while the lifting dimension of the fibrous filler (A) from the surface is controlled to be equal to or less than approximately half of the fiber diameter of the fibrous filler (A), it is possible to obtain the resin molding with light weight and high strength as well as a good appearance with the lifting of the fibrous filler (A) being controlled.

Even with the blow molding method that has a lower pressing force to the mold surface of the metal mold 22 as compared to an injection molding method, by controlling the temperature of the metal mold 22, the fluidity of the resin composition can be enhanced to improve the rate of transfer of the metal mold, and the lifting of the fibrous filler (A) can be controlled, so that the appearance of the entire resin molding can be improved.

When the crystalline resin is used as the thermoplastic resin (B), not only the crystallization on the surface of the resin molding but also the crystallization of the entire resin molding can be controlled comprehensively, warpage deformation of the resin molding can be solved, thus enhancing dimensional accuracy.

Since the resin molding can be obtained only by adding a temperature controller (the mold temperature controlling tube, the cooling jacket, etc.) for controlling the temperature of the metal mold to a generally-used molding machine, utilization thereof can be spread.

Note that the present invention is not limited to the embodiment described above, but includes modifications and improvements as long as the object of the present invention is achieved.

For instance, although the instrument panel module 1 as the automobile interior part is formed by integrally molding the instrument panel fascia 10, the air conditioning duct 11, the defroster duct 12 and the reinforce member 13 in the embodiment described above, the air conditioning duct, the defroster duct and the reinforce member that are integrally molded and the instrument panel fascia that is separately molded may be assembled to obtain the automobile interior part.

Although the two slide cores 25 for preventing the undercut are provided to the predetermined parts on a back side of the instrument panel module 1 in the embodiment described above, the number of the slide cores 25 may not be necessarily two, but may be three, one, or even zero.

Although the temperature controlling mechanism, the mold-temperature controlling tube and the cooling jacket are described as means for controlling the temperature of the metal mold, the arrangement is not limited thereto. For instance, as a method for controlling the temperature of the metal mold, there may be employed a method of circulating a heating medium in the metal mold, a method of electrical heating such as resistance heating and dielectric heating, a method of providing a heater to a body of the metal mold, and the like. Also, for a cooling method, there may be employed a method of circulating a coolant in the metal mold and the like.

In the embodiment described above, an antioxidant, an antistatic agent, an ultraviolet absorber, a light stabilizer, a flame retardant, a flame retardant assistant, a pigment, a dispersing agent, a nucleating agent and the like may be added to the resin composition as needed.

EXAMPLE

The advantage of the present invention will be described referring to a specific example.

Example 1

In Example 1, the automobile interior part 1 having a thickness of 3 mm at a general portion was molded under the following molding conditions by the blow molding method in accordance with the above-described embodiment.

(Molding Conditions)

Blow molding machine: IPB-EPML-90S [die: 200 mmφ, accumulator capacity: 32 liters, clamping pressure: 60 tons, screw diameter: 90 mm) manufactured by IHI (Ishikawajima-Harima Heavy Industries Co., Ltd.)]

Metal mold: a testing mold for an instrument panel module [mold surface without grain: mirror finish of 0.5 S or lower, and design surface: grain finish with a grain depth of 80 μm]

| Mold temperature: | In shaping; 135° C. |
| --- | --- |
| | In keeping; 125° C. |
| | In cooling; 50° C. |

In shaping, heating is performed by circulating the steam in the mold-temperature controlling tube 221. In keeping, the water is introduced into the cooling jacket 222 while circulating the steam in the mold-temperature controlling tube 221. In cooling, the steam is discharged from the mold-temperature controlling tube 221 and the water is circulated in the cooling jacket 222.

Blowing time: 150 seconds

Resin composition: Fibrous filler (A); GF chopped strand [fiber diameter: 10 μm, fiber length: 3 mm]

Thermoplastic resin (B); B-PP: propylene block copolymer [IDEMITSU PP, E-185G, MI: 0.5 g/10 minutes (230° C., 2.16 kg loading), Vicat softening point: 145° C., crystallization point: 125° C., melt point: 160° C., manufactured by Idemitsu Petrochemical Co., Ltd.,]

Loading of fibrous filler (A): 30 wt % (relative to 100 wt % of resin composition)

The resin composition obtained by compounding the fibrous filler (A), the thermoplastic resin (B) and a carbon black for facilitating visualization of the lifting of a glass fiber was molded by the blow molding method based on the embodiment described above.

[Comparison 1]

In Comparison 1, a resin molding was manufactured by the method same as Example except that the molding condition in Example was changed as follows.

Mold temperature: 80° C. (constant)

In Comparison 1, the resin composition was shaped in the metal mold heated to 80° C., and cooling was started after a predetermined time. In other words, a step for keeping the metal mold at a predetermined temperature was not performed after shaping the crystalline resin composition, which was different from Example.

The instrument panel module 1 (automobile interior part) molded in accordance with Example and Comparison 1 described above were evaluated by the following evaluation methods.

(Evaluation Method)

1. Surface Roughness

Fine irregularity on a resin composition molding surface obtained by the metal mold with the mirror finish was measured using a scanning laser microscope (LSM-GM manufactured by Olympus Optical Co., Ltd).

This measurement was performed for the resin moldings molded in accordance with Example, Comparison 1 and Comparison 2.

2. Lifting of Fibrous Filler

Photographs of cross sections of design side surfaces of the samples were taken by an electron microscope to observe the lifting of the fibrous filler.

3. Rate of Transfer of Metal Mold on Molding

Grain height on a resin molding surface obtained by the metal mold with the grain finish was measured using the scanning laser microscope (LSM-GM manufactured by Olympus Optical Co., Ltd). Also, the grain depth on the surface of the metal mold with the grain finish was measured similarly. Then, the ratio was calculated by dividing the grain height on the resin molding surface by the grain depth on the metal mold surface.

This measurement was performed for the resin moldings molded in accordance with Example 3 and Comparison 2.

4. Sink and Warpage

Presence of a sink on the resin molding surface was visually evaluated. Also, warpage and deformation were visually evaluated by placing the resin molding on a horizontal plane.

Evaluation result ○: Good

Δ: Sink and warpage are slightly observed x: Sink and warpage are clearly observed The evaluation results of Example, Comparison 1 and Comparison 2 are shown in Table 1.

Figure 5:
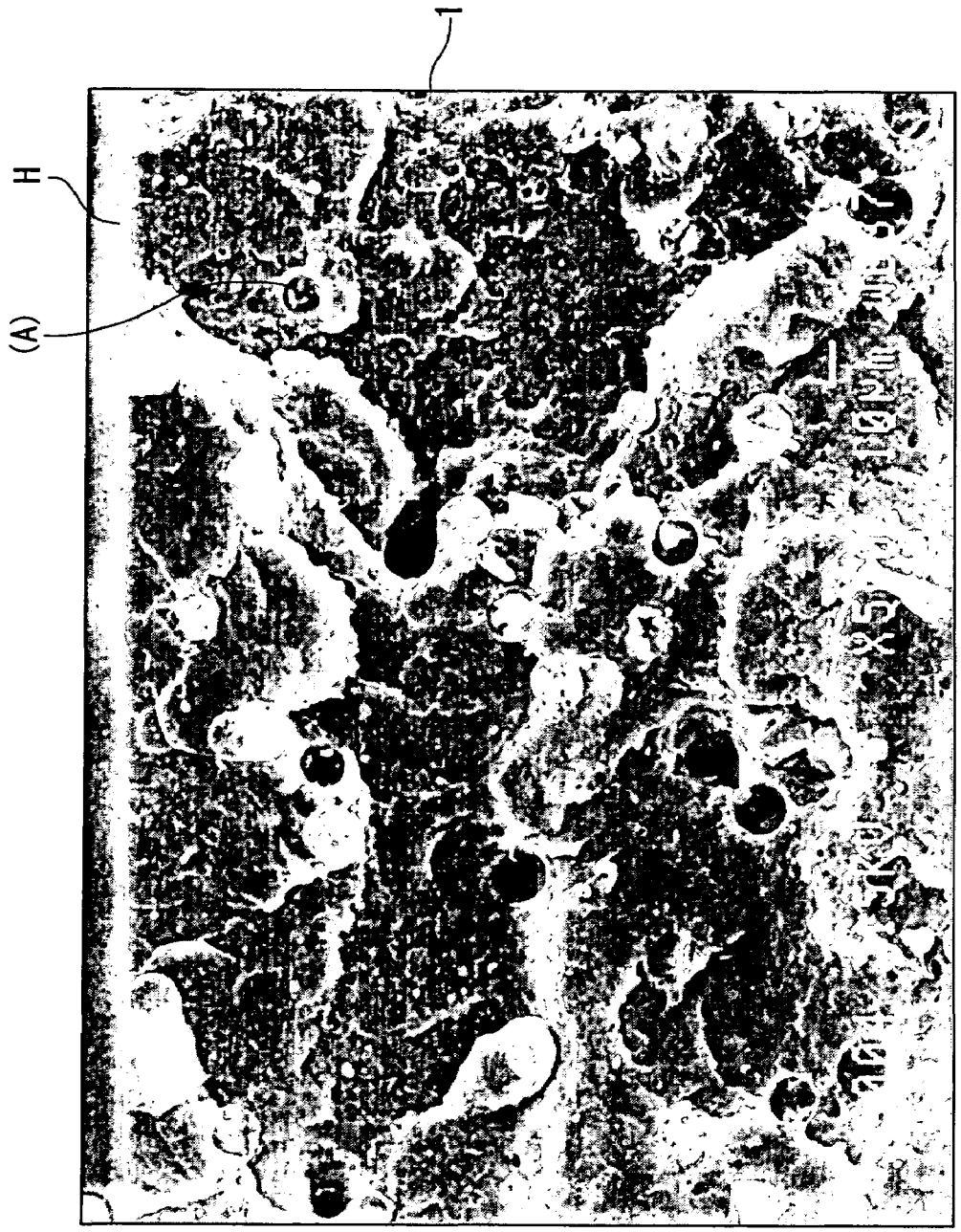
FIG. 5 is a photo showing freeze-fracture of an instrument panel module according to the embodiment.
Figure 6:
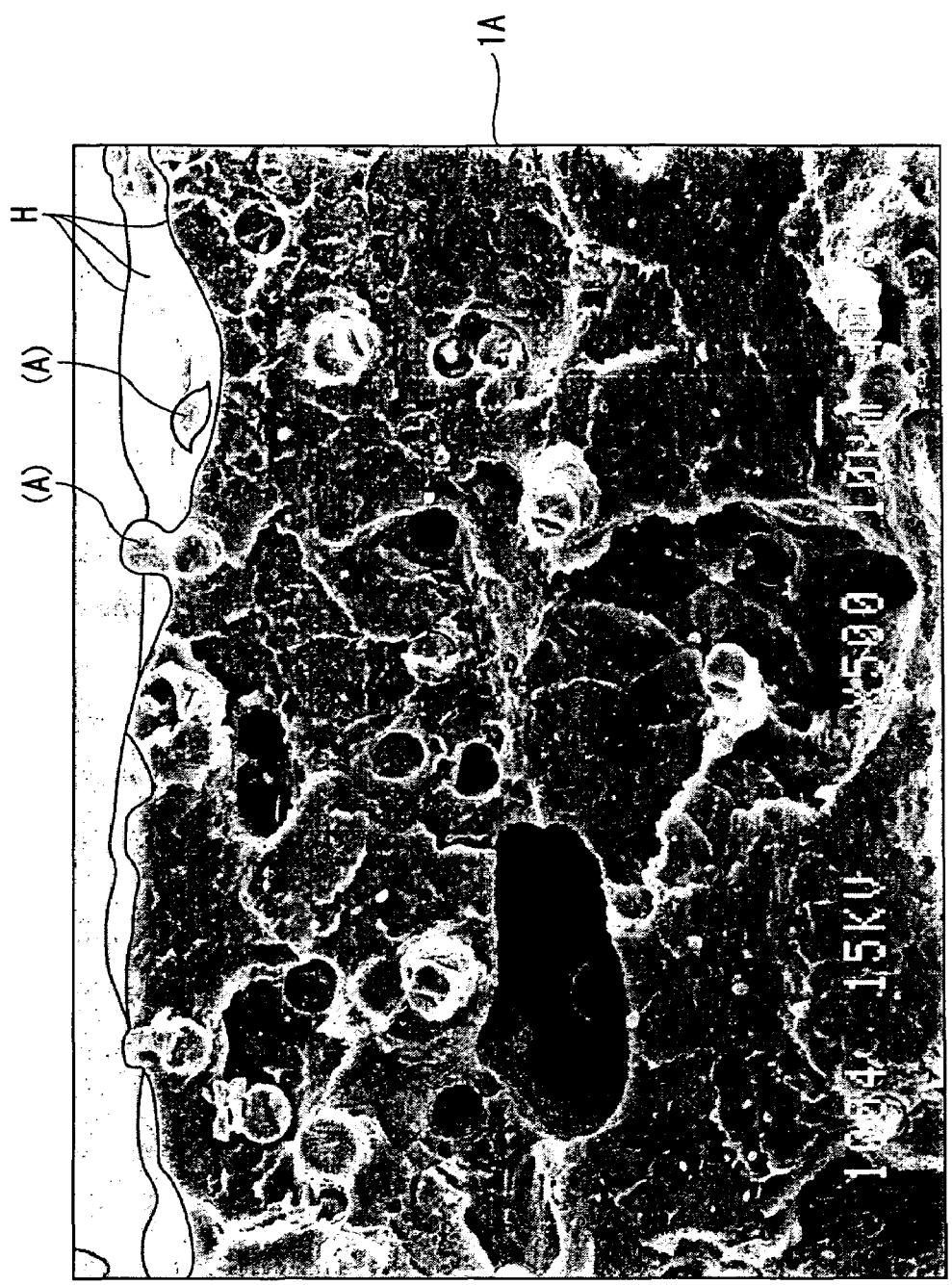
FIG. 6 is a photo showing freeze-fracture of an instrument panel module of Comparison 1.

For each of the instrument panel module 1 of Example and an instrument panel module 1A of Comparison 1, a mirror portion on the design side was freeze-fractured. FIGS. 5 and 6 show the photos of the freeze-fractured portion taken by the electron microscope.

TABLE 1

| | Example | Comparison 1 | Comparison 2 |
| --- | --- | --- | --- |
| Product arrangement | Instrument panel fascia, duct, reinforce member were integrally designed and molded | Same as Example | Each member is separately designed and manufactured |

TABLE 1-continued

|  | Example | Comparison 1 | Comparison 2 |
|---|---|---|---|
| Used material | GFPP | Same as Example | Instrument panel fascia: PP<br>Duct: HDPE<br>Reinforce member: iron steel |
| Molding method | High transfer blowing molding<br>Mold keeping temp.: 125° C.<br>Mold cooling temp.: 50° C. | Typical blow molding<br>Mold temperature: 80° C.<br>(constant) | Instrument panel fascia: injection molding<br>Duct: blow molding<br>Reinforce member: bending and welding |
| Development steps | Few | Few | Many |
| Assembly steps | Few | Few | Many |
| Product cost | Inexpensive | Inexpensive | Expensive |
| Weight | Light | Light | Weight increased |
| Appearance | Good grain transfer (Transfer rate: 95%) | Insufficient grain transfer (Transfer rate: 50% or lower) Fine irregularity appeared | Good grain transfer |

In Example, the result showed the reduced number of development steps and assembly steps as well as inexpensive product cost.

Also, the rate of grain transfer was 95%, which indicated good grain transfer. Further, the resin molding did not show degradation of the appearance due to the lifting of the fiber (the lifting was not visually observed) on the surface including the mirror portion, as well as having good resistance to scratches.

Here, when the rate of transfer of the metal mold is less than 90%, the average surface roughness of the resin molding likely exceeds 5 μm, which means the resin filler (A) is likely exposed on the resin molding surface. In Example, since the rate of transfer of the metal mold was 95%, it was verified that good appearance could be obtained with the lifting of the fibrous filler (A) being controlled and with the grain being securely transferred.

Also, as shown in FIG. 5 that shows the photo of the freeze-fractured mirror portion on the design side of the instrument panel module 1 of Example, which was taken by the electron microscope, it was verified that the design side surface H was quite smooth and no lifting of the fibrous filler (A) such as a glass fiber was not observed on the design side surface H.

In Comparison 1, as in Example, the result showed the reduced number of development steps and assembly steps as well as inexpensive product cost.

However, the rate of grain transfer was 50%, which indicated insufficient grain transfer. Also, the fine irregularity was generated on the mirror portion due to the lifting of the fiber, which caused degradation of appearance. The surface roughness at a portion without the grain was 40 μm.

Also, as shown in FIG. 6 that shows the photo of the freeze-fractured mirror portion on the design side of the instrument panel module 1A of Comparison 1, which was taken by the electron microscope, it was verified that a design side surface H1 was unsmooth and the lifting of the fibrous filler (A) such as a glass fiber was observed (at two positions on the photo) on the design side surface H1. The lifting dimension on one part (right side in FIG. 6) was approximately half of the fiber diameter, while that of the other part (left side in FIG. 6) was approximately equal to the fiber diameter (about 10 μm).

Note that since FIG. 6 was created based on the photo taken at 500-fold magnification, the original state did not clearly show a boundary between the design side surface H1 and a fracture cross section, a boundary between the design side surface H1 and the background, and the lifting of the fiber from the design side surface H1. Thus, profiles of the boundaries and the lifting of the fiber were emphasized with heavy-lines.

A commercially-available instrument panel was evaluated as Comparison 2. In Comparison 2, the reinforce member that was fabricated by bending and welding the iron steel was jointed to the duct with a bolt, which caused large number of assembly steps, expensive product cost and heavy weight. There was no data for the surface roughness, the lifting of the fiber and the rate of transfer of the molding (not measured).

INDUSTRIAL APPLICABILITY

The present invention can be applied to an automobile interior part or the like.

The invention claimed is:

1. An automobile interior part disposed on a front side of an automobile, comprising:
   a duct; and
   a reinforcing member, wherein
   the duct and the reinforcing member are integrally molded by a blow molding method that includes extruding a resin composition into a molten parison, holding the parison in a metal mold, and blowing the air into the parison to obtain a resin molding,
   wherein the interior part is formed by a fiber-reinforced resin, and
   wherein the fiber-reinforced resin is formed by a resin composition containing a fibrous filler in the range from 7 to 30 wt % and a resin in the range from 70 to 93 wt %, and
   a lifting dimension of the fibrous filler appearing on and lifted from a design side surface of the automobile interior part is controlled to be equal to or smaller than half of a fiber diameter of the fibrous filler.

2. An automobile interior part disposed on a front side of an automobile, comprising:

a duct; and a reinforcing member, wherein the duct and the reinforcing member are integrally molded by a blow molding method that includes extruding a resin composition into a molten parison, holding the parison in a metal mold, and blowing the air into the parison to obtain a resin molding, wherein an instrument panel fascia is integrally molded with the duct and the reinforcing member by the blow molding method, wherein the interior part is formed by a fiber-reinforced resin, and wherein the fiber-reinforced resin is formed by a resin composition containing a fibrous filler in the range from 7 to 30 wt % and a resin in the range from 70 to 93 wt %, and a lifting dimension of the fibrous filler appearing on and lifted from a design side surface of the automobile interior part is controlled to be equal to or smaller than half of a fiber diameter of the fibrous filler.

3. An automobile interior part disposed on a front side of an automobile, comprising:

a duct; and a reinforcing member, wherein the duct and the reinforcing member are integrally molded by a blow molding method that includes extruding a resin composition into a molten parison, holding the parison in a metal mold, and blowing the air into the parison to obtain a resin molding, wherein the interior part is formed by a fiber-reinforced resin, and wherein the fiber-reinforced resin is formed by the resin composition containing the fibrous filler in the range from 7 to 30 wt % and the resin in the range from 70 to 93 wt %, a surface of the interior part has a grain, (1) when an entire surface of a resin molding has the grain, rate of transfer of the metal mold is equal to or higher than 70%, and (2) when a part of the surface of the resin molding has the grain, the rate of transfer of the metal mold is equal to or higher than 70%, and a surface roughness of a part without the grain is equal to or less than 5 μm.

4. An automobile interior part disposed on a front side of an automobile, comprising:

a duct; and a reinforcing member, wherein the duct and the reinforcing member are integrally molded by a blow molding method that includes extruding a resin composition into a molten parison, holding the parison in a metal mold, and blowing the air into the parison to obtain a resin molding, wherein an instrument panel fascia is integrally molded with the duct and the reinforcing member by the blow molding method, wherein the interior part is formed by a fiber-reinforced resin, and wherein the fiber-reinforced resin is formed by the resin composition containing the fibrous filler in the range from 7 to 30 wt % and the resin in the range from 70 to 93 wt %, a surface of the interior part has a grain, (1) when an entire surface of a resin molding has the grain, rate of transfer of the metal mold is equal to or higher than 70%, and (2) when a part of the surface of the resin molding has the grain, the rate of transfer of the metal mold is equal to or higher than 70%, and a surface roughness of a part without the grain is equal to or less than 5 μm.

* * * * *